United States Patent
Hicks

(10) Patent No.: US 8,075,062 B2
(45) Date of Patent: Dec. 13, 2011

(54) MONOLITHIC DUAL-PURPOSE TRAILER

(76) Inventor: Randall Hicks, Van Vieck, TX (US)

( * ) Notice: Subject to any disclaimer, the term of this patent is extended or adjusted under 35 U.S.C. 154(b) by 988 days.

(21) Appl. No.: 11/979,147

(22) Filed: Oct. 31, 2007

(65) Prior Publication Data

US 2008/0116733 A1    May 22, 2008

Related U.S. Application Data

(63) Continuation of application No. 11/263,855, filed on Nov. 2, 2005, now Pat. No. 7,306,291.

(51) Int. Cl.
*B60P 1/56* (2006.01)

(52) U.S. Cl. ............ 298/8 H; 298/29; 298/33; 298/35 R

(58) Field of Classification Search ................. 298/8 H, 298/29, 33, 35 R, 31, 27, 35 M; 105/248, 105/250, 251
See application file for complete search history.

(56) References Cited

U.S. PATENT DOCUMENTS

| | | | |
|---|---|---|---|
| 1,935,057 A | 11/1933 | Natali | |
| 2,547,269 A | 4/1951 | Kinsey | |
| 2,768,021 A | 10/1956 | Kaster | |
| 3,037,807 A | 6/1962 | Hicks | |
| 3,310,345 A | 3/1967 | Rowden | |
| 3,319,393 A | 5/1967 | Tantlinger et al. | |
| 3,361,478 A | 1/1968 | Ross, Jr. et al. | |
| 3,595,175 A | 7/1971 | Austill | |
| 3,692,363 A | 9/1972 | Tenebaum et al. | |
| 3,759,573 A | 9/1973 | Rosenbaum | |
| 3,901,552 A | 8/1975 | Stone | |
| 3,917,084 A | 11/1975 | Swisher, Jr. et al. | |
| 4,082,357 A | 4/1978 | Schmidt, Jr. et al. | |
| 4,221,427 A | 9/1980 | Sentle, Jr. et al. | |
| 4,453,761 A | 6/1984 | Felburn | |
| 4,497,259 A | 2/1985 | Titterton | |
| 4,557,400 A | 12/1985 | Clarke | |
| 4,606,570 A | 8/1986 | Neumann | |
| 4,643,475 A | 2/1987 | Nuemann | |
| 4,678,389 A | 7/1987 | Bonerb | |
| 4,883,321 A | 11/1989 | Voigt | |
| 4,946,214 A | 8/1990 | Nuemann et al. | |
| 5,022,809 A | 6/1991 | Hinson | |
| 5,224,761 A | 7/1993 | Hagenbuch | |
| RE35,580 E | 8/1997 | Heider et al. | |
| 5,957,538 A | 9/1999 | Sullivan | |
| 5,971,494 A | 10/1999 | Farris | |
| 6,059,372 A * | 5/2000 | McDonald et al. | 298/8 H |
| 6,164,866 A | 12/2000 | Wulff | |
| 7,306,291 B2 * | 12/2007 | Hicks | 298/8 H |

OTHER PUBLICATIONS

Jet Co. Manufactures Grain Trailers, Flatbed, Dropdeck and Tag Trailers, [retrieved on Nov. 2, 2005] Retrieved from the Internet: <URL: http://www.jetcompany.com/dropdeck.html>.

(Continued)

*Primary Examiner* — Stephen Gordon
(74) *Attorney, Agent, or Firm* — Diederiks & Whitelaw, PLC

(57) ABSTRACT

A monolithic dual-purpose trailer for transporting cargo includes a frame including two longitudinally extending side rails and a central reinforcing member in the form of an engineered truss is located between the two side rails. Wheels are mounted to the frame. A deck including a load bearing surface with a grate is formed on the frame. Hoppers are positioned below the grate. The frame is formed as one solid welded unit. The deck has a portion formed of flat aluminum. A perimeter frame rail is located around the deck. The trailer can transport multiple types of loads and does not have to be converted from one mode to another and additionally has reduced longitudinal flexing.

12 Claims, 5 Drawing Sheets

OTHER PUBLICATIONS

Travis Body & Trailer of Houston, Atlanta and Tulsa, Jan. 2004, [retrieved on Nov. 2, 2005] Retrieved from the Internet: <URL: http://www.travistrailers.com/alumbotdump/index.asp>.

Western Trailers Inc., Homepage, Oct. 2004, Retrieved from the Internet: <URL: http://www.westerntrailer.com.com/English/Products/Flatbeds/HopperFlat.htm>.

* cited by examiner

MONOLITHIC DUAL-PURPOSE TRAILER

CROSS-REFERENCE TO RELATED APPLICATIONS

This application represents a continuation of U.S. patent application Ser. No. 11/263,855, filed Nov. 2, 2005 entitled "Monolithic Dual-Purpose Trailer", now U.S. Pat. No. 7,306,291.

BACKGROUND OF THE INVENTION

1. Field of the Invention

The present invention pertains to the art of hauling cargo from place to place and more particularly to trailers used to haul either discrete cargo that is typically transported on a flat bed and loose bulk cargo such as crushed stone or sand that is typically transported in a hopper.

2. Discussion of the Prior Art

In the past large discrete items of cargo have been traditionally transported on flatbed trailers and loose bulk cargo has been transported in trailers that have hoppers. Since such trailers are designed to transport only one type of load, often the trailers made a trip one-way loaded and make a return trip empty. Traveling in a non-loaded condition is wasteful and considered undesirable because of the large cost of fuel and labor costs associated with moving an empty trailer.

In response to this problem Schmidt et al have proposed in U.S. Pat. No. 4,082,357 to start with a box-type semi-trailer and adding a grate type floor and hoppers. The patent then teaches a relatively complicated conversion system which supposedly allows an operator to convert the trailer from a hopper configuration to a box configuration. Numerous walls and partitions must be moved and sealed to change the trailer from one configuration to the other.

Sentle, Jr. et al. have proposed a dual purpose trailer body for converting between a first configuration for handling freight of a bulk nature such as coils of steel or paper and to a second configuration for handling comminuted material such as dolomite or grain. The patent teaches moving large floor panels from a horizontal position to a vertical position to convert the trailer from the first to second positions.

Apparently the difficulties involved with these types of convertible trailers in terms of the effort required to convert them from one configuration to another has been so great that none of them are currently in mass production except for a trailer produced by Western Trailers. Even the Western Trailer unit has so many problems with the conversion process that divers will only convert them seasonally. The trailers still often travel in a non-load condition because of the labor and safety issues involved with converting the trailer is so great it is cheaper to run the trailer empty.

Also in all of the above-mentioned convertible trailers and indeed for flat bed trailers generally there is the additional problem of the trailers having weakness in the longitudinal direction that allows undesirable longitudinal flexing.

Based on the above, there is a need in the art for a trailer that can transport multiple types of loads and does not have to be converted from one mode to another and additionally reduces longitudinal flexing.

SUMMARY OF THE INVENTION

In accordance with the invention a monolithic dual-purpose trailer for transporting cargo includes a frame including two longitudinally extending side rails and a central reinforcing member in the form of an engineered truss is located between the two side rails. Wheels are mounted to the frame. A deck including a load-bearing surface with a grate is formed on the frame. A hopper is positioned below the grate. The frame is formed as one solid welded unit. The deck has a portion formed of flat aluminum. A perimeter frame rail is located around the deck.

A second hopper is located behind the hopper and wherein the grate includes a front portion and a rear portion and the hopper is located below the front portion and the second hopper is located below the rear portion. A hopper divider is located between the hoppers and attached to the frame. Actuators are use for opening a closing the hoppers. Lateral rails extend between the side rails, the lateral and side rails being located along the perimeter. An upper cross beam and a lower cross beam each extend between the side rails and connected to the truss.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
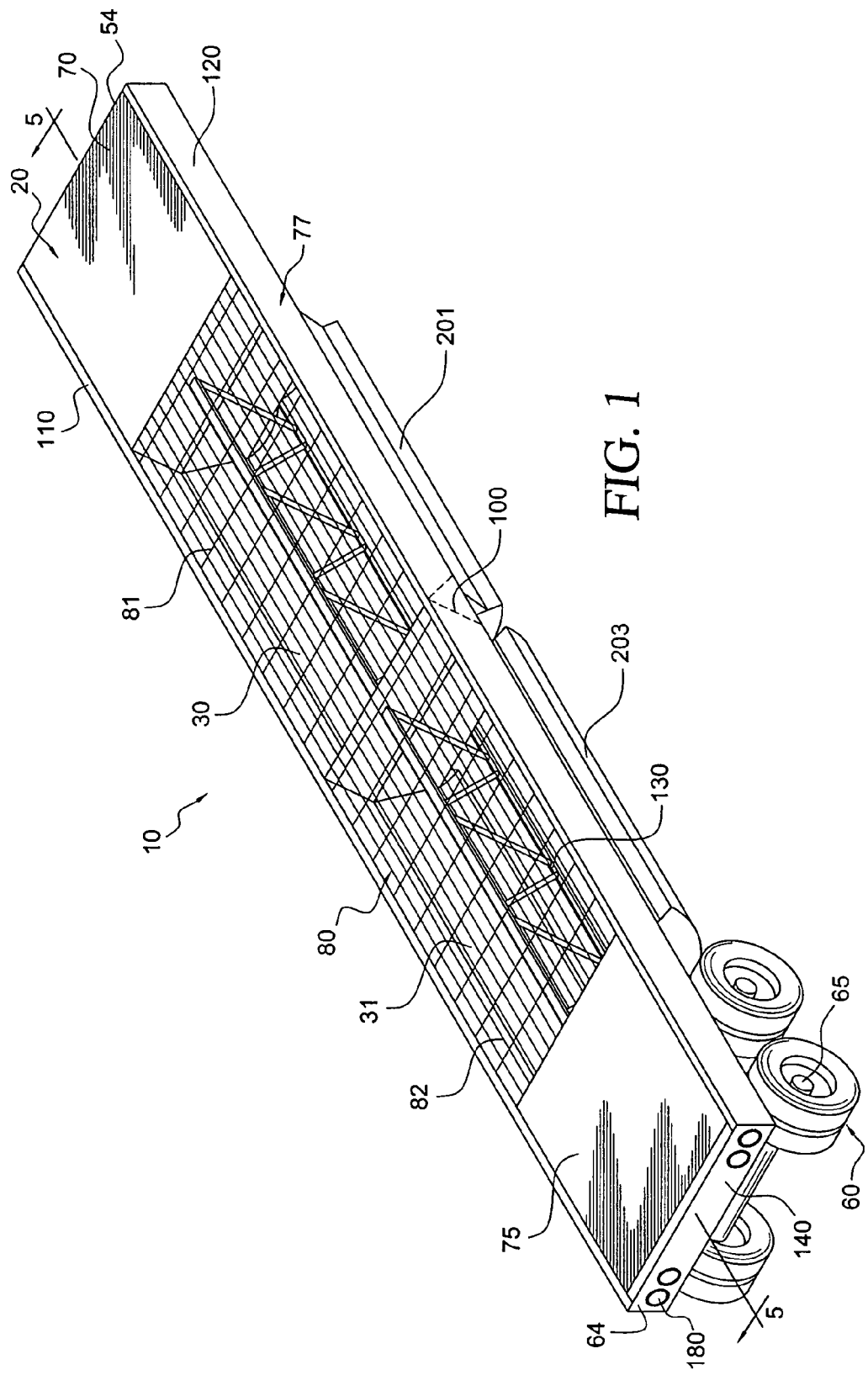
FIG. 1 is a top perspective view of the vehicle trailer incorporating a preferred embodiment of the invention.
Figure 2:
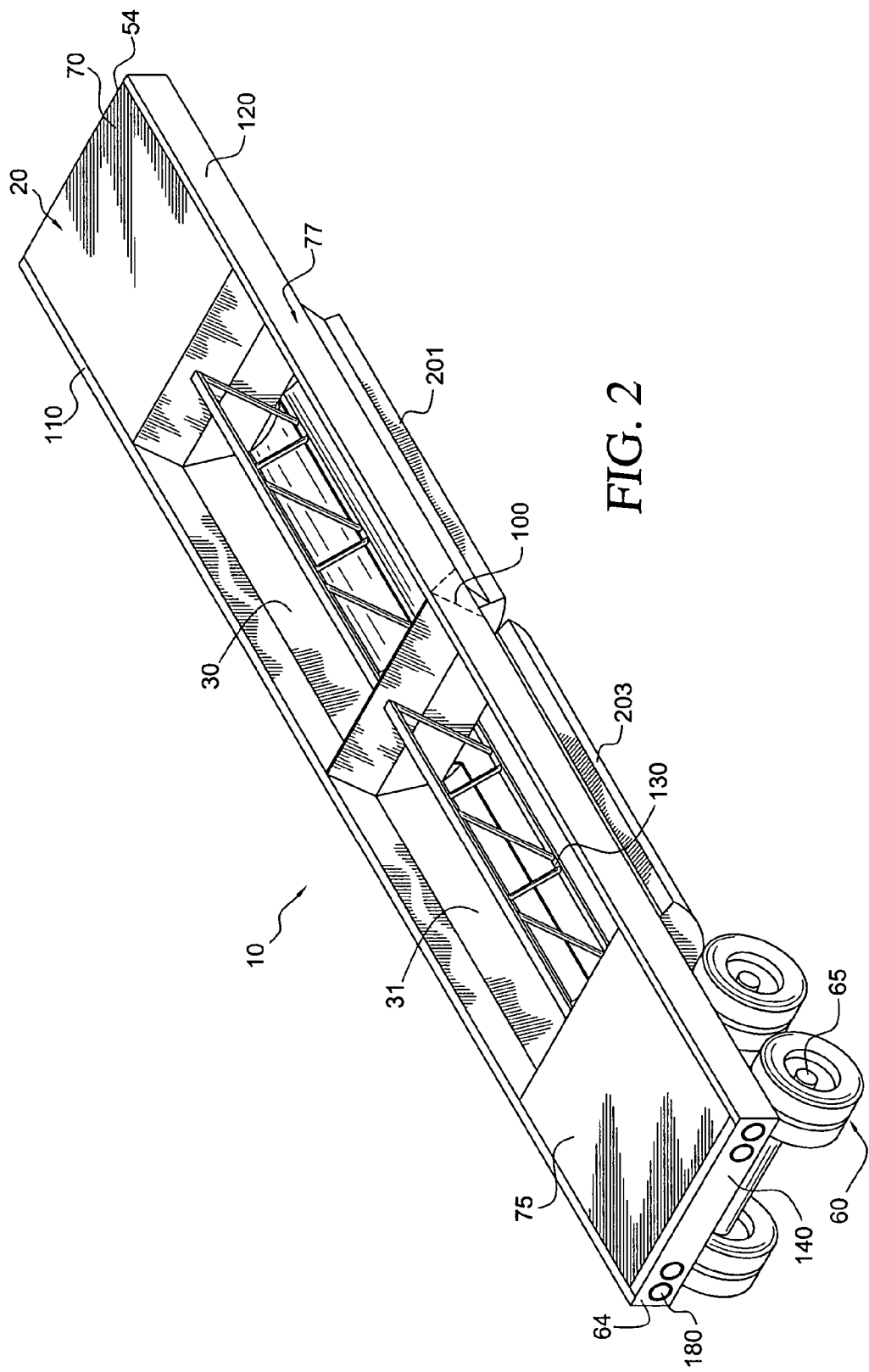
FIG. 2 is a top perspective view of the trailer of FIG. 1 with the grate removed.
Figure 3:
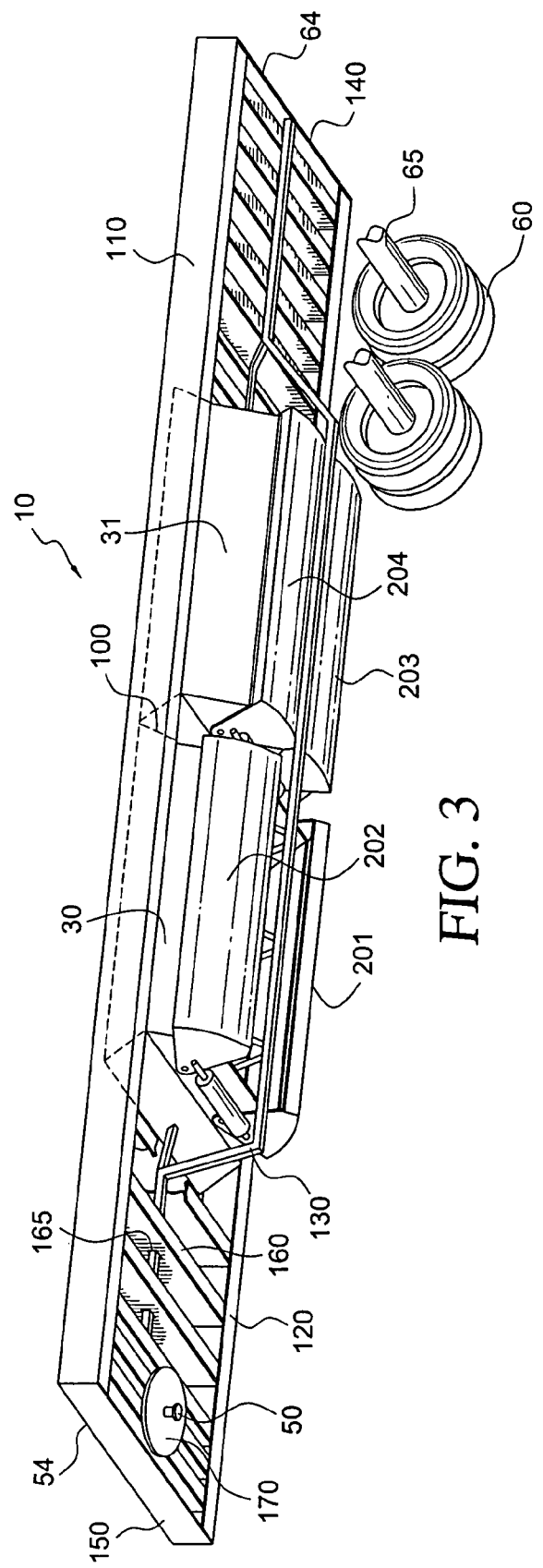
FIG. 3 is a bottom perspective view of the trailer of FIG. 1 showing one hopper gate open and the other hopper gate closed.

With initial reference to FIGS. 1-3, there is illustrated a nonconvertible monolithic dual-purpose trailer 10 constructed in accordance with a preferred embodiment of the invention. Trailer 10 has a longitudinally extending deck 20 that is preferably flat. First and second hoppers 30, 31 are located below deck 20. Deck 20 is capable of transporting any load typically loaded on a flatbed trailer. For example, discrete cargo such paper rolls, coils of steel, lumber and the like are transported on deck 20. The first and second hoppers 30, 31 are capable of carrying comminuted, loose bulk material such as sand or crushed stone.

Generally trailer 10 is supported by a king pin 50 at a first end 54 and by wheels 60 at a second end 64. Wheels 60 are mounted on axles 65 that in turn are mounted to trailer 10 by a suspension system (not shown) as is well known in the art. As shown there are eight wheels however it is envisioned that the number and placement of the wheels could change depending on load requirements. Pin 50 is designed to engage a tractor (not shown) to form a tractor-trailer unit as is well known in the art. Pin 50 is welded securely to trailer 10. Of course other structural arrangements could be used to attach the trailer to a tractor.

Deck 20 includes a first flat portion 70 at first end 54 that is generally rectangular and is strong enough to support discrete cargo. A second flat portion 75 of similar construction to first portion 70 is located at second end 64 of deck 20. Flat portions 70, 75 are preferably made of aluminum but may be made of any suitable material. Aluminum is preferred because it is light and has sufficient strength to carry cargo typically hauled by flatbed trailers. Steel or other similar materials could be used. The flat portions 70, 75 are permanently fixed to a frame 77 preferably by welding. While not shown, flat portions 70, 75 may be fitted with metal hoops set in recesses. The hoops may either lay flat or be pivoted upright so that a rope or cable may be passed therethrough to secure cargo placed on deck 20.

A steel or aluminum grate 80 is located between flat portions 70, 75. Preferably grate 80 is permanently welded to trailer 10. Grate 80 is made of two portions 81, 82, one portion being located over each hopper 30, 31. Grate 80 is shown as being removed in FIG. 2. Grate 80 has openings large enough to allow loose bulk cargo to pass though into hoppers 30, 31. Grate 80 is also strong enough to hold discrete cargo. A hopper divider 100 is welded between first and second portions 81, 82 of grate 80 and provides extra strength for deck 20.

Located below deck 20 is main frame 77 of trailer 10. Frame 77 includes two longitudinal side rails 110, 120 that extend the entire length of trailer 10. A central truss 130 also extends longitudinally and is located between side rails 110, 120. Front and rear end rails 150, 140 are located at each end of trailer 10. A plurality of crossbeams 160 are located under each flat portion 70, 75 of deck 20.

Turning now to first end 54 of trailer 10 as best seen in FIG. 3, longitudinal side rails 110, 120 support the edges of flat portions 70, 75 of deck 20. Cross beams 160 extend laterally between first and second side rails 110, 120 and also provide support for deck portion 20. A generally circular support 170 is attached to several of cross beams 160 and pin 50 is attached to circular support 170. Holes 165 are provided in cross beams 160 to allow central truss 130 to pass therethrough. A pair of extendable supports (not shown) may be attached to crossbeams 160. Such supports allow trailer 10 to remain upright when not attached to a tractor.

Turning now to second end 64 of trailer 10 as shown in FIGS. 1 and 3, longitudinal side rails 110, 120 support the edges of flat portions 70, 75 of deck 20. Cross beams 160 extend laterally between side rails 110, 120 and also provide support for flat portions 70, 75. An end rail 140 is provided with lights 180 to indicate when trailer 10 is braking or turning. Central truss 130 passes below cross beams 160 and ends at rail 150. Wheels 60 and associated axles 65 are attached to cross beams 160 in a known manner.

FIG. 2 shows grate 80 removed from trailer 10 so that gates 201, 202, 203 and 204 of hoppers 30, 31 can be clearly seen. First hopper 30 is shown with gates 201, 202 in the closed position while second hopper 31 is shown with gates 203, 204 in the open position. Gates 201, 202, 203 and 204 are used to unload hoppers 30, 31 of their cargo. Additionally engineered truss 130 passes between gates 201, 202, 203 and 204.

Figure 4:
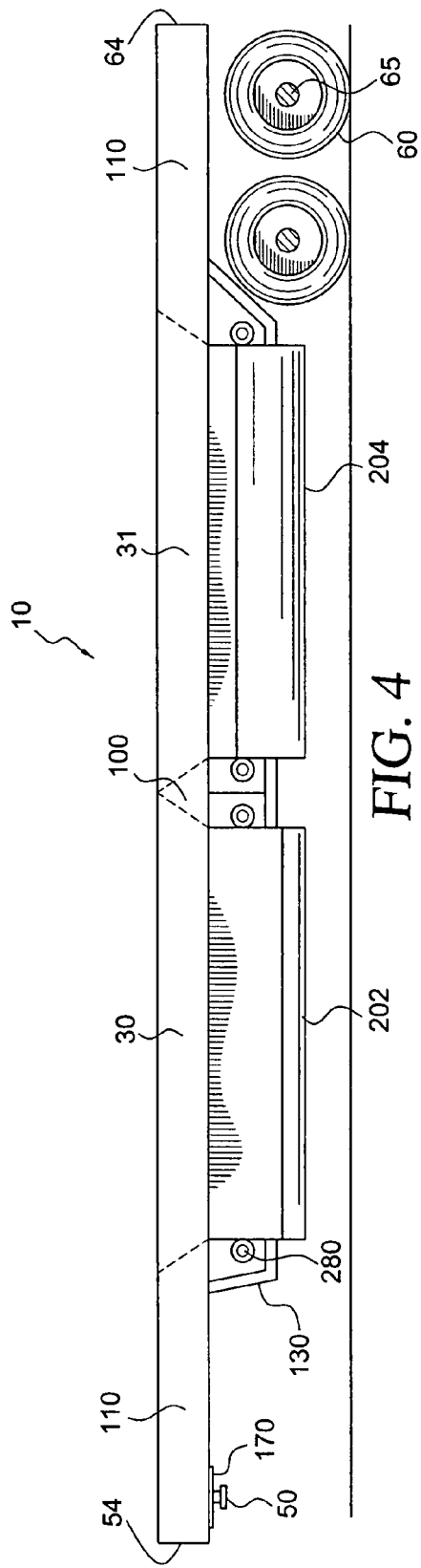
FIG. 4 is a side view of the trailer of FIG. 1.
Figure 5:
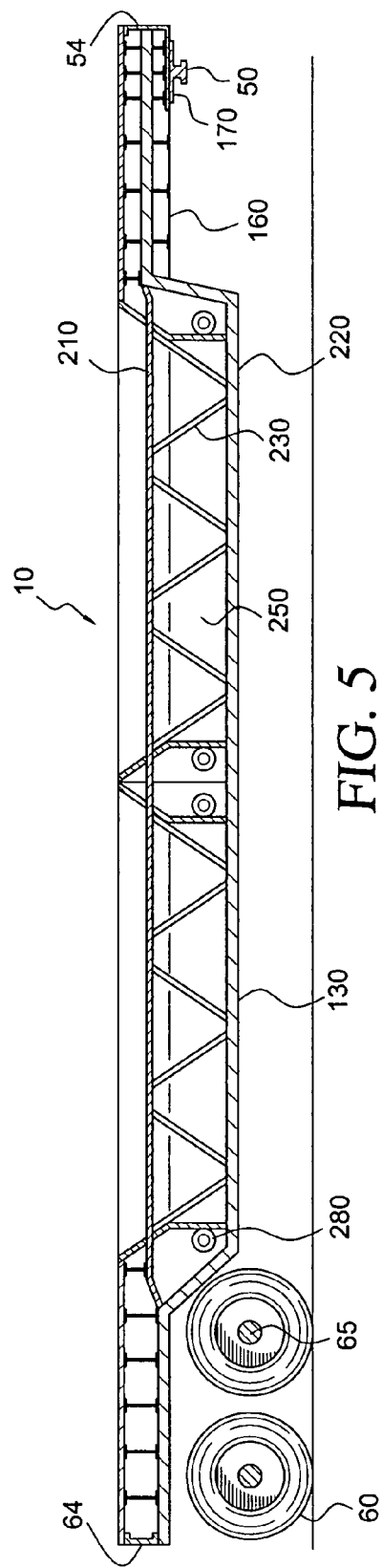
FIG. 5 is a cross-section view of along the line 5-5 of FIG. 1.

Turning now to FIGS. 4 and 5 engineered truss 130 can be seen in more detail. FIG. 4 shows a side view of trailer 10 while FIG. 5 shows a cross section of trailer 10 along the line 5-5 of FIG. 1. Truss 130 is centered between side rails 110, 120 and between gates 201, 202, 203 and 204. Truss 10 has a deck support rail 210 and a base support rail 220. Connecting beams 230 extend between deck support rail 210 and base support rail 220 and thus forming a truss structure. Generally triangular openings 250 are formed between connecting beams 230 and support rails 210, 220. The geometry of truss 130 substantially eliminates the longitudinal flexure usually found in conventional flat bed trailers and bottom dump trailers.

Figure 6:
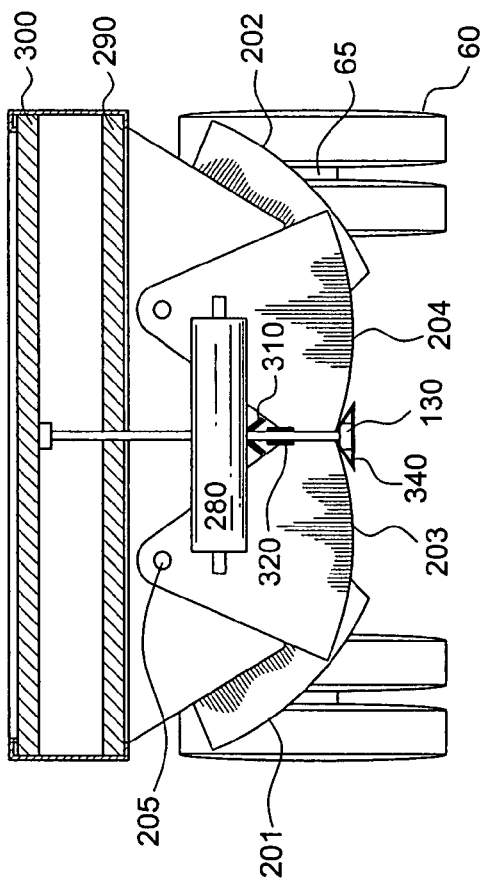
FIG. 6 is an end view of the trailer of FIG. 1.
Figure 7:
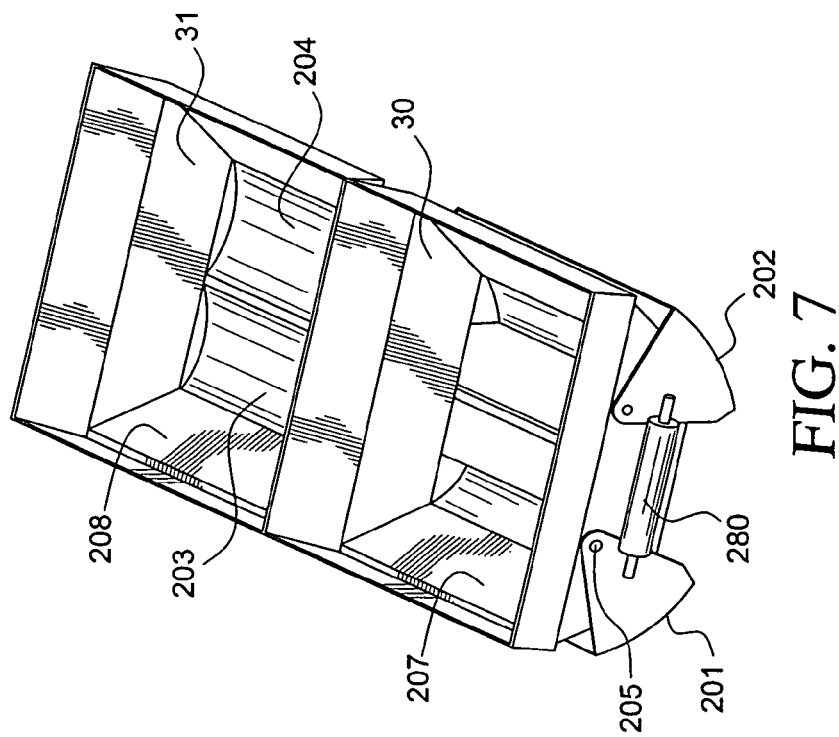
FIG. 7 is a top perspective view of the hoppers removed from the trailer.

Trailer 10 as described above is essentially a monolithic one-piece welded unit with a low center of gravity. In use trailer 10 can carry loads in both hoppers 30, 31 and on deck 20 simultaneously. Further since trailer 10 is not convertible and stays in the same configuration at all times hoppers 30, 31 are easily sealed when they are manufactured and do not have the sealing problems present in convertible trailers As shown in FIGS. 6 and 7, air cylinders 280 control gates 201, 202, 203 and 204 for each hopper 30, 31. While air cylinders are preferred, other types of actuators may be used. For example it is also possible to use hydraulic or electrically operated actuators. Cylinders 280 may be remotely controlled so a driver does not need to leave truck's cab to unload trailer 10. The operation of gates 201, 202, 203 and 204 can be seen in FIG. 6 in which gates 201, 202 are shown in an open position and gates 203, 204 are shown in a closed position. A cross member 290 is secured to truss 130 and supports hoppers 30, 31. A deck cross member 300 is also connected to truss 130 and supports deck 20.

As best seen in FIG. 6, a downward sloping seal guard 310 is attached to truss 130. Seal guard 310 keeps most of the cargo in hopper 31 from passing between truss 130 and the edge of gates 203 and 204. Seals 320 are preferably made of hard rubber and are bolted to truss 130. Seals 320 are struck by gates 203 and 204 as they close thus prevent any small amount of cargo that does pass seal guard 310 from dropping onto the road. A skid plate 340 is provided on truss 130 to protect seals 320 and gates 203 and 204 from damage.

In operation trailer 10 may be loaded with one type of cargo when traveling in one direction and then loaded with another type of cargo on a return trip. Since there is a greater chance trailer 10 will be loaded on each trip as compared to either a flatbed or a hopper significant saving will occur. Additionally drivers may be able to service more customers because they can haul more varied types of cargo. Since trailer 10 does not have to be converted between two separate configurations time is saved because the conversion process does not have to occur. Further the operator does not have to risk injuries that may occur during the conversion process.

Although described with reference to a preferred embodiment of the invention, it should be readily understood that various changes and/or modifications can be made to the invention without departing from the spirit thereof. In general, the invention is only intended to be limited by the scope of the following claims.

I claim:

1. A monolithic dual-purpose trailer for transporting cargo comprising:
    a frame including two side rails extending in a longitudinal direction and a central reinforcing member located between the two side rails and extending in the longitudinal direction, wherein the central reinforcing member is an engineered truss;
    wheels mounted to the frame;
    a deck including a load bearing surface with a grate formed therein; and
    a hopper positioned below the grate.

2. The trailer according to claim 1, further comprising: an upper cross beam and a lower cross beam, each beam extending between the side rails and connected to the truss.

3. The trailer according to claim 1, wherein the hopper has two sides and the truss extends between the two sides of the hopper.

4. The trailer according to claim 1, wherein the frame is formed as one solid welded unit.

5. The trailer according to claim 1, wherein the deck has a portion formed of flat aluminum.

6. The trailer according to claim 1, further comprising: a perimeter frame rail.

7. The trailer according to claim 1, further comprising: a second hopper and wherein the grate includes a front portion and a rear portion and the hopper is located below the front portion and the second hopper is located below the rear portion.

8. The trailer according to claim 7, further comprising: a hopper divider located between the hoppers and attached to the frame.

9. The trailer according to claim 7, further comprising: actuators for opening and closing the hoppers.

10. The trailer according to claim 1, further comprising: a perimeter, and lateral rails extending between the side rails, the lateral and side rails being located along the perimeter.

11. The trailer according to claim 1, further comprising: an upper cross beam and a lower cross beam, each beam extending between the side rails and connected to the truss.

12. The trailer according to claim 1, wherein the hopper has two sides and the truss extends between the two sides of the hopper.

* * * * *